United States Patent
Olakangil et al.

(10) Patent No.: US 11,470,009 B2
(45) Date of Patent: Oct. 11, 2022

(54) IMPLEMENTING MULTI-TABLE OPENFLOW USING A PARALLEL HARDWARE TABLE LOOKUP ARCHITECTURE

(71) Applicant: Arista Networks, Inc., Santa Clara, CA (US)

(72) Inventors: Joseph Olakangil, San Jose, CA (US); Nitin Karkhanis, Fremont, CA (US); Anuraag Mittal, Livermore, CA (US)

(73) Assignee: Arista Networks, Inc., Santa Clara, CA (US)

(*) Notice: Subject to any disclaimer, the term of this patent is extended or adjusted under 35 U.S.C. 154(b) by 202 days.

(21) Appl. No.: 16/703,741

(22) Filed: Dec. 4, 2019

(65) Prior Publication Data

US 2021/0119926 A1    Apr. 22, 2021

Related U.S. Application Data

(60) Provisional application No. 62/923,354, filed on Oct. 18, 2019.

(51) Int. Cl.
*H04L 47/2483* (2022.01)
*H04L 45/00* (2022.01)
(Continued)

(52) U.S. Cl.
CPC .......... *H04L 47/2483* (2013.01); *H04L 45/38* (2013.01); *H04L 45/74591* (2022.05); *H04L 49/3063* (2013.01); *H04L 69/22* (2013.01)

(58) Field of Classification Search
CPC . H04L 47/2483; H04L 45/38; H04L 49/3063; H04L 69/22; H04L 45/7457; H04L 45/745; H04L 45/64
(Continued)

(56) References Cited

U.S. PATENT DOCUMENTS

2015/0016450 A1* 1/2015 Suemitsu ............... H04L 45/64
  370/389
2015/0146718 A1* 5/2015 Wang ..................... H04L 45/52
  370/389

(Continued)

OTHER PUBLICATIONS

Ben Pfaff et al., "OpenFlow Switch Specification", Open Networking Foundation, Jun. 25, 2012, 106 pages.

*Primary Examiner* — Kwang B Yao
*Assistant Examiner* — Syed M Bokhari
(74) *Attorney, Agent, or Firm* — Fountainhead Law Group P.C.

(57) ABSTRACT

Techniques for implementing multi-table OpenFlow using a parallel hardware table lookup architecture are provided. In certain embodiments, these techniques include receiving, at a network device from a software-defined networking (SDN) controller, flow entries for installation into flow tables of the network device, where the flow entries are structured in a manner that assumes the flow tables can be looked-up serially by a packet processor of the network device, but where the flow tables are implemented using hardware lookup tables (e.g., TCAMs) that can only be looked-up in parallel by the packet processor. The techniques further include converting, by the network device, the received flow entries into a format that enables the packet processor to process ingress network traffic correctly using the flow entries, despite the packet processor's parallel lookup architecture, and installing the converted flow entries into the flow tables/hardware lookup tables.

20 Claims, 5 Drawing Sheets

(51) Int. Cl.
*H04L 49/00* (2022.01)
*H04L 69/22* (2022.01)
*H04L 45/745* (2022.01)

(58) Field of Classification Search
USPC .......................................... 370/392, 389, 254
See application file for complete search history.

(56) References Cited

U.S. PATENT DOCUMENTS

2016/0157274 A1* 6/2016 Akiyoshi .............. H04W 88/16
  370/254
2017/0111259 A1* 4/2017 Wen ........................ H04L 45/02
2021/0273883 A1* 9/2021 Hu .......................... H04L 45/64

* cited by examiner

IMPLEMENTING MULTI-TABLE OPENFLOW USING A PARALLEL HARDWARE TABLE LOOKUP ARCHITECTURE

CROSS-REFERENCES TO RELATED APPLICATIONS

The present application claims the benefit and priority under 35 U.S.C. 119(e) of U.S. Provisional Application No. 62/923,354, filed Oct. 18, 2019, entitled "Implementing Multi-Table OpenFlow Using a Parallel Hardware Table Lookup Architecture." The entire contents of this provisional application are incorporated herein by reference for all purposes.

BACKGROUND

OpenFlow is a networking protocol and device specification that enables software-defined networking (SDN) controllers to remotely manage and control the forwarding plane of network devices such as switches and routers. An SDN controller that implements the OpenFlow specification is referred to herein as an OF controller and a network device that implements the OpenFlow specification is referred to herein as an OF network device.

In operation, an OF controller generates packet processing rules, known as flow entries, for an OF network device and communicates the generated flow entries to the device via OpenFlow "add-flow-entry" (OFPFC_ADD) messages. Each flow entry includes, among other things, a set of match fields specifying one or more criteria for matching network packets to the flow entry and a set of actions to be executed on matched packets. Upon receiving add-flow-entry messages from the OF controller, the OF network device installs the flow entries identified in the messages into one or more lookup tables, known as flow tables, that are part of the device's OpenFlow packet processing pipeline (i.e., OF pipeline). These flow tables are typically implemented using ternary content addressable memory (TCAM) banks (referred to herein as simply TCAMs) that reside within the device's packet processor. Once the flow entries are installed into the flow tables/TCAMs, they are matched against ingress network packets in accordance with the OF pipeline (as implemented via TCAM lookup logic in the packet processor). If a match between a particular flow entry and a particular packet is found, the flow entry's actions are executed on that packet.

In the case where an OF pipeline comprises multiple flow tables, the OpenFlow specification states that the flow tables should be sequentially ordered and that the OF pipeline should employ a serial table lookup model in which (1) ingress network packets are initially matched against flow entries of the first flow table (e.g., flow table 0); (2) if a packet is matched to a flow entry and the flow entry's action(s) include a "goto table" action identifying a downstream flow table, the packet is matched against the flow entries of that downstream flow table; and (3) if a packet is matched to a flow entry and the flow entry's action(s) do not include a "goto table" action, pipeline processing is terminated at the current flow table. This type of OF pipeline (referred to herein as a multi-table OF pipeline) is relatively straightforward to implement using packet processors that can perform lookups into their TCAMs on a serial, per-TCAM basis and that support the ability to "jump" from one TCAM to another as indicated by the "goto table" action.

However, some packet processors, such as those designed to meet a lower price point or designed prior to the creation/standardization of OpenFlow, employ a purely parallel TCAM lookup architecture where an ingress packet is matched against the flow entries in all of the packet processor's TCAMs in parallel. These packet processors are significantly more difficult to leverage for multi-table OpenFlow purposes because they do not natively support the serial table lookup model mandated by the OpenFlow specification. For example, consider a scenario in which a multi-table OF pipeline is composed of three flow tables 0, 1, and 2 in that order and each flow table is mapped to a corresponding TCAM of a packet processor employing a parallel TCAM lookup architecture. Assume that each flow table/TCAM is populated with flow entries sent from an OF controller as shown below:

TABLE 1

| | Flow Table/TCAM 0 | Flow Table/TCAM 1 | Flow Table/TCAM 2 |
| --- | --- | --- | --- |
| Flow entry 1 | match: VLAN 100 action: goto table 2 | match: all packets action: drop | match: all packets action: output packet on interface 5 |
| Flow entry 2 | match: VLAN 101 action: goto table 1 | | |

In this scenario, if an ingress network packet is received by the packet processor that identifies "VLAN 100," the OF controller expects, per the OpenFlow specification, that the following sequence of pipeline processing steps will occur:

1. The packet will be matched against the flow entries of first flow table/TCAM 0
2. A match will be found between the packet and flow entry 1 of flow table/TCAM 0 and the "goto table 2" action will be executed, causing pipeline processing to proceed to flow table/TCAM 2
3. The packet will be matched against the flow entries of flow table/TCAM 2
4. A match will be found between the packet and flow entry 1 of flow table/TCAM 2 and the "output packet on interface 5" action will be executed, causing the packet to be forwarded out on interface 5

However, because the packet processor in this example is designed to lookup all of its TCAMs in parallel, what actually will happen is that three matches will be found simultaneously: a first match between the packet and flow entry 1 of flow table/TCAM 0, a second match between the packet and flow entry 1 of flow table/TCAM 1, and a third match between the packet and flow entry 1 of flow table/TCAM 2. This will result in three conflicting actions to be executed—"goto table 2," "drop," and "output packet on interface 5"—which is an unintended and incorrect outcome.

DETAILED DESCRIPTION

Figure 1:
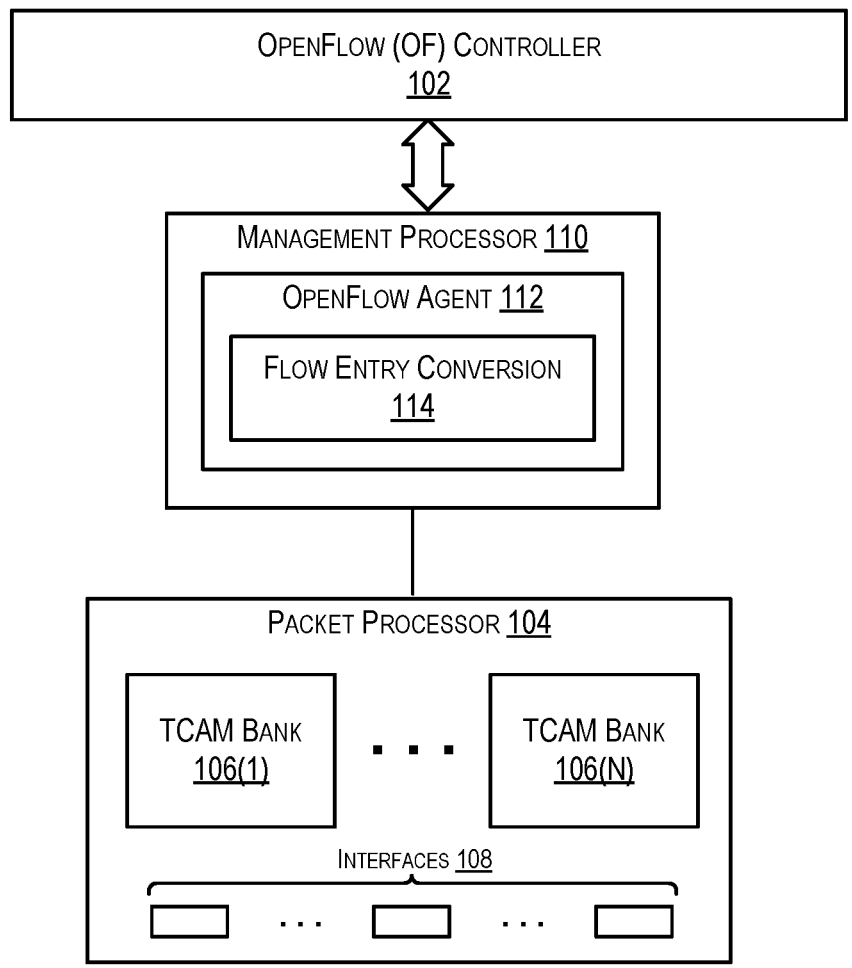
FIG. 1 depicts an OF network device according to certain embodiments.

In the following description, for purposes of explanation, numerous examples and details are set forth in order to provide an understanding of various embodiments. It will be evident, however, to one skilled in the art that certain embodiments can be practiced without some of these details or can be practiced with modifications or equivalents thereof.

Embodiments of the present disclosure are directed to techniques for implementing, by a network device such as a switch or router, a multi-table OpenFlow (OF) pipeline (or alternatively, a multi-table packet processing pipeline that is functionally similar to such an OF pipeline) using a parallel hardware table lookup architecture.

In one set of embodiments, the network device can receive, from e.g. a software-defined networking (SDN) controller, flow entries for installation into flow tables of the network device, where the flow entries are structured in a manner that assumes the flow tables can be looked-up (i.e., used for matching ingress network packets) serially by a packet processor of the network device, but where the flow tables are implemented using hardware lookup tables (e.g., TCAMs) that can only be looked-up in parallel by the packet processor. For example, the flow entries may be structured in accordance with the assumptions/requirements for multi-table OF pipeline processing laid out in the OpenFlow specification.

In response, the network device can convert the received flow entries into a format that enables the packet processor to process ingress network traffic correctly using the flow entries, despite the packet processor's parallel hardware table lookup architecture. For example, in certain embodiments this conversion process can include modifying the match fields and/or actions of the flow entries in a way that ensures ingress packets are matched serially against the flow tables (starting from the first flow table), and that packets matching a flow entry with a "goto table" action are recirculated to the network device/packet processor, thereby enabling the packet to be matched again against the flow entries of the appropriate destination flow table. Once the flow entries are converted in this fashion, the network device can install the flow entries into the device's flow tables/hardware lookup tables for use by the packet processor during device runtime.

In various embodiments and examples below, for purposes of explanation, it is assumed that the network device is an OpenFlow (OF) network device and that the embodiments/examples facilitate the implementation of a multi-table OF pipeline on the device. However, the techniques of the present disclosure are not strictly limited to OpenFlow and thus may be used to implement any kind of multi-table SDN or packet processing pipeline in which serial flow table processing, with support for "goto table" or other similar actions, is desired or needed.

Further, certain embodiments and examples below assume that the flow tables of the network device are specifically mapped to TCAMs (or more particularly, TCAM banks) of the device's packet processor. However, in alternative embodiments these flow tables may be implemented using other types of hardware lookup tables, such as, e.g., hardware hash tables. Accordingly, all references to "TCAM" or "TCAM bank" in the present disclosure may be interchangeably replaced with the more generic term "hardware lookup table."

1. Example Network Device

FIG. 1 is a simplified block diagram illustrating the architecture of an OpenFlow (OF) network device 100 that implements the techniques of the present disclosure according to certain embodiments. As shown, OF network device 100 is communicatively coupled with an OF controller 102 and includes, inter alia, a packet processor 104, a plurality of TCAM banks (i.e., TCAMs) 106(1)-(N), a plurality of interfaces (i.e., network ports) 108, and a management processor 110.

Packet processor 104 is a hardware-based processing component, such as a field-programmable gate array (FPGA) or application-specific integrated circuit (ASIC), that receives network packets ingressing or egressing OF network device 100 via interfaces 108 and processes the ingress/egress packets, at the line rate of the interfaces, in accordance with packet processing rules (i.e., flow entries) installed in TCAMs 106(1)-(N). In various embodiments, packet processor 104 performs this packet processing using hard-wired TCAM lookup table logic that controls how processor 104 performs lookups into TCAMs 106(1)-(N) (or in other words, how the processor matches packets against the flow entries of the TCAMs).

Management processor 110 is a general-purpose processing component, such as an Intel/AMD x86 or ARM-based processor, that administers and manages the operation of OF network device 100 by executing program code maintained in an associated volatile memory and/or non-transitory computer readable storage medium (not shown). For example, as depicted in FIG. 1, management processor 110 can execute a software-based OpenFlow agent 112.

In various embodiments, OpenFlow agent 112 is configured to communicate with OF controller 102 and process OpenFlow protocol messages sent by OF controller 102 for managing/controlling the behavior of OF network device 100's forwarding plane (including the behavior of packet processor 104). For instance, among other things, OpenFlow agent 112 can receive OpenFlow add-flow-entry messages for adding new flow entries to flow tables corresponding to OF network device 100's OF packet processing pipeline, where each flow table in the OF pipeline is mapped to (or in other words, implemented using) a TCAM 106. Each such flow entry typically includes a set of match fields specifying one or more criteria for matching network packets to the flow entry, as well as a set of actions specifying one or more actions to be taken on matched packets. Upon receiving the add-flow-entry messages, OpenFlow agent 112 can install/program the flow entries identified in the messages into TCAMs 106(1)-(N). Packet processor 104 can then use these installed flow entries at the time of receiving network packets in order to process/forward the packets in accordance with the OF pipeline.

Figure 2:
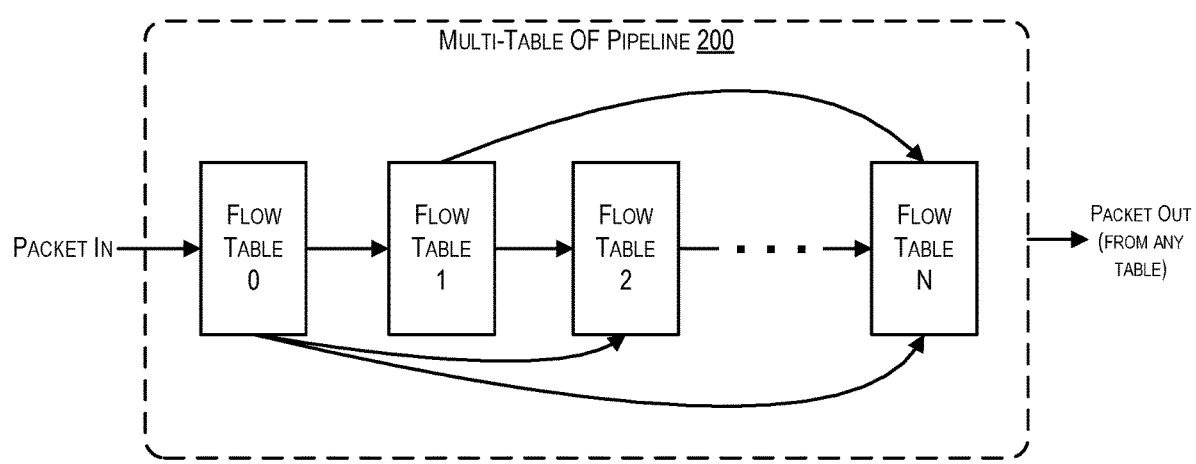
FIG. 2 depicts a multi-table OF processing pipeline according to certain embodiments.

As noted in the Background section, in the scenario where an OF pipeline is composed of multiple flow tables, the OpenFlow specification assumes that the flow tables are sequentially ordered/numbered starting from, e.g., number 0. In addition, the OpenFlow specification mandates that the OF pipeline employ a serial table lookup model in which packets are matched against the flow tables on a serial (i.e., per-flow table) basis starting from the first flow table in the pipeline, and upon being matched to a flow entry with a "goto table" action identifying a downstream flow table, a packet is matched against that downstream flow table. This process can repeat each time the packet is matched to another flow entry with a "goto table" action, until the packet is finally matched to a flow entry without the "goto table" action (at which point pipeline processing ends). FIG. 2 depicts a schematic diagram of a multi-table OF pipeline 200 that illustrates this general packet processing flow. As shown in FIG. 2, an ingress packet is initially received and matched at first flow table 0. Lookup processing then proceeds to one or more downstream flow tables per the "goto table" action until the packet is finally handled (e.g., dropped or forwarded) and thus exits the pipeline.

Figure 3:
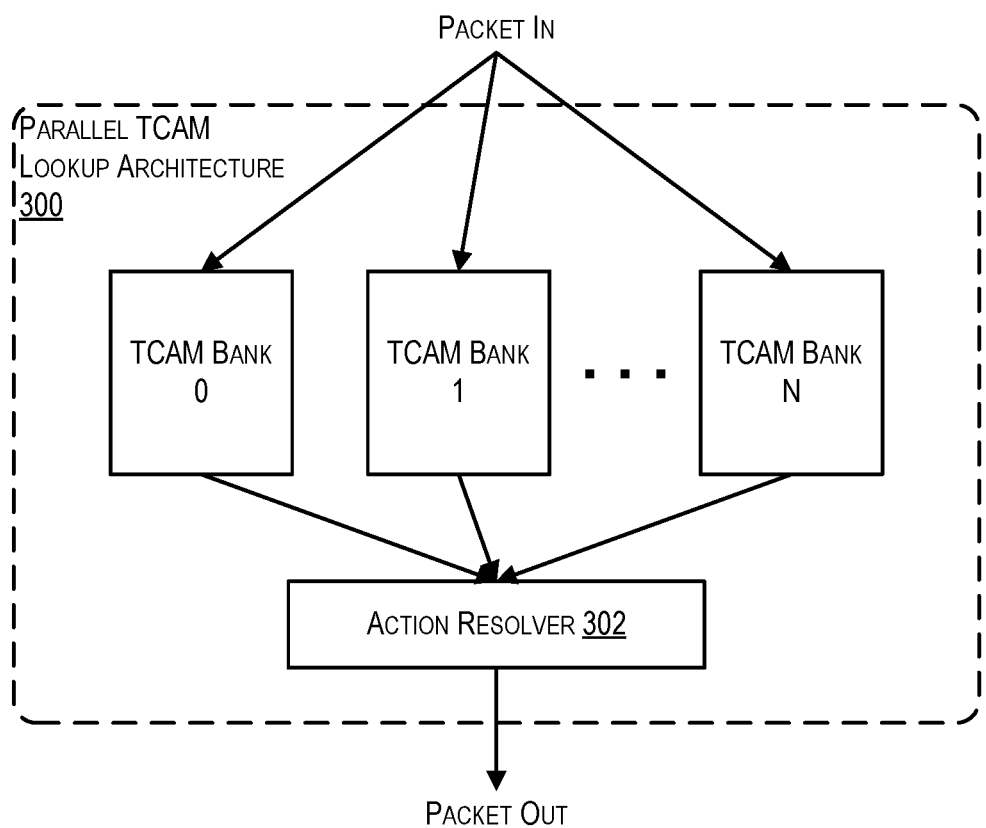
FIG. 3 depicts a parallel TCAM lookup architecture according to certain embodiments.

However, assume that packet processor 104 of OF network device 100 employs a parallel TCAM lookup architecture in which packet processor 104 is hard-wired to match network packets against all TCAMs 106(1)-(N) in parallel. An example of such a parallel TCAM lookup architecture 300 is depicted in FIG. 3. As shown in this figure, an ingress network packet is received and matched to flow entries in TCAMs 0, 1, and 2 simultaneously. The lookup action/result for each TCAM is then sent to an action resolver component 302, which chooses an action to take on the packet and applies the chosen action. As mentioned previously, implementing a multi-flow OF pipeline using this type of parallel TCAM lookup architecture is problematic because it does not conform to the serial processing requirements mandated by the OpenFlow specification and thus can result in unintended and incorrect packet processing results.

To address this issue and other similar issues, OpenFlow agent 112 of OF network device 100 is enhanced to include a flow entry conversion module 114 according to certain embodiments of the present disclosure. At a high level, OpenFlow agent 112 can, at the time of enabling multi-table OpenFlow on device 100, configure an interface 108 as a recirculation interface, which causes all packets sent by device 100 to that interface to be looped back (and thus "re-circulated") as a new ingress packet to packet processor 104. Then, each time OpenFlow agent 112 receives an add-flow-entry message from OF controller 102 for adding a flow entry E to a flow table T of its multi-table OF pipeline, the agent can execute, via conversion module 114, a flow entry conversion process that involves: (1) if table T is the first flow table in the pipeline, adding a new match field to flow entry E specifying that packets which match to E cannot include a predefined (e.g., "match-table") metadata field; (2) if table T is a second or subsequent flow table in the pipeline, adding a new match field to flow entry E specifying that packets which match to E must include the match-table metadata field with the field's value set to the identifier (ID)/sequence number of table T; and (3) if flow entry E includes a "goto table X" action, replacing this action in E's action set with one or more new actions that cause packet processor 104 to add the match-table metadata field to the packet (if not already there), set the value of this metadata field to the ID/sequence number of flow table X, and send the packet (with the match-table metadata field) to the recirculation interface.

Finally, upon converting/modifying flow entry E per steps (1)-(3) as needed, OpenFlow agent 112 can install/program E into flow table T (and thus, into the TCAM corresponding to flow table T) for use by packet processor 104.

With the approach outlined above, OpenFlow agent 112 advantageously enables packet processor 104 to process network packets in a manner that is effectively identical to the multi-table serial lookup model specified by the OpenFlow specification, despite the parallel TCAM lookup architecture of packet processor 104. To understand why this is the case, assume packet processor 104 receives an ingress packet P for the first time (which will not include the match-table metadata field). In this scenario, packet processor 104 will match packet P against all flow tables/TCAMs in parallel per its parallel lookup architecture. However, because packet P does not have the match-table metadata field, P will not be capable of matching to flow entries in the second and subsequent flow tables/TCAMs of the pipeline (which include the new match field added at step (2) above that requires this metadata field to be present and set to the flow table's ID/sequence number); rather, P will only be capable of matching to flow entries in the first flow table/TCAM. This conforms to the multi-table OpenFlow requirement that ingress packets be initially be matched against the first flow table.

Further, assume that packet P matches a flow entry F1 in the first flow table/TCAM which originally included a "goto table 2" action at the time of receipt from OF controller 102. In this scenario, packet processor 104 will add the match-table metadata field to P, set the field value to 2 (i.e., the ID/sequence number of flow table 2), and send P to the recirculation interface, in accordance with the new actions added to flow entry F1 in step (3) above. This, in turn, will cause packet P to re-enter the TCAM lookup logic of packet processor 104, and the packet processor will then match P against all flow tables/TCAMs in parallel again. However, in this pass, packet P will only be capable of matching to flow entries in flow table/TCAM 2 by virtue of the packet's match-table metadata field (which is set to 2) and the new match field added to the flow entries of flow table/TCAM 2 per step (2) above (which requires the match-table metadata field to be set to 2). Thus, this sequence of events conforms to the multi-table OpenFlow requirement regarding the handling of "goto table" actions.

Yet further, assume that packet P matches a flow entry F2 in flow table/TCAM 2 which did not include a "goto table" action at the time of receipt from OF controller 102. In this scenario, packet processor 104 will simply execute the action(s) specified in flow entry F2 on the packet and conclude its processing. Thus, this conforms to the multi-table OpenFlow requirement that pipeline processing be terminated at a matched flow entry if the matched flow entry does not include a "goto table" action.

The following sections provide further details regarding the flow entry conversion process executed by OpenFlow agent 112/conversion module 114 and the resulting behavior of packet processor 104 when processing network traffic. It should be appreciated that the architecture of OF network device 100 shown in FIG. 1 is illustrative and not intended to limit embodiments of the present disclosure. For example, although FIG. 1 depicts a particular arrangement for components within device 100, other arrangements are possible (e.g., the functionality attributed to a particular component may be split into multiple components, components may be combined, etc.). Further, OF network device 100 may include other components/sub-components and/or implement other functions that are not specifically described. One of ordinary skill in the art will recognize other variations, modifications, and alternatives.

2. OpenFlow Agent Workflow

Figure 4:
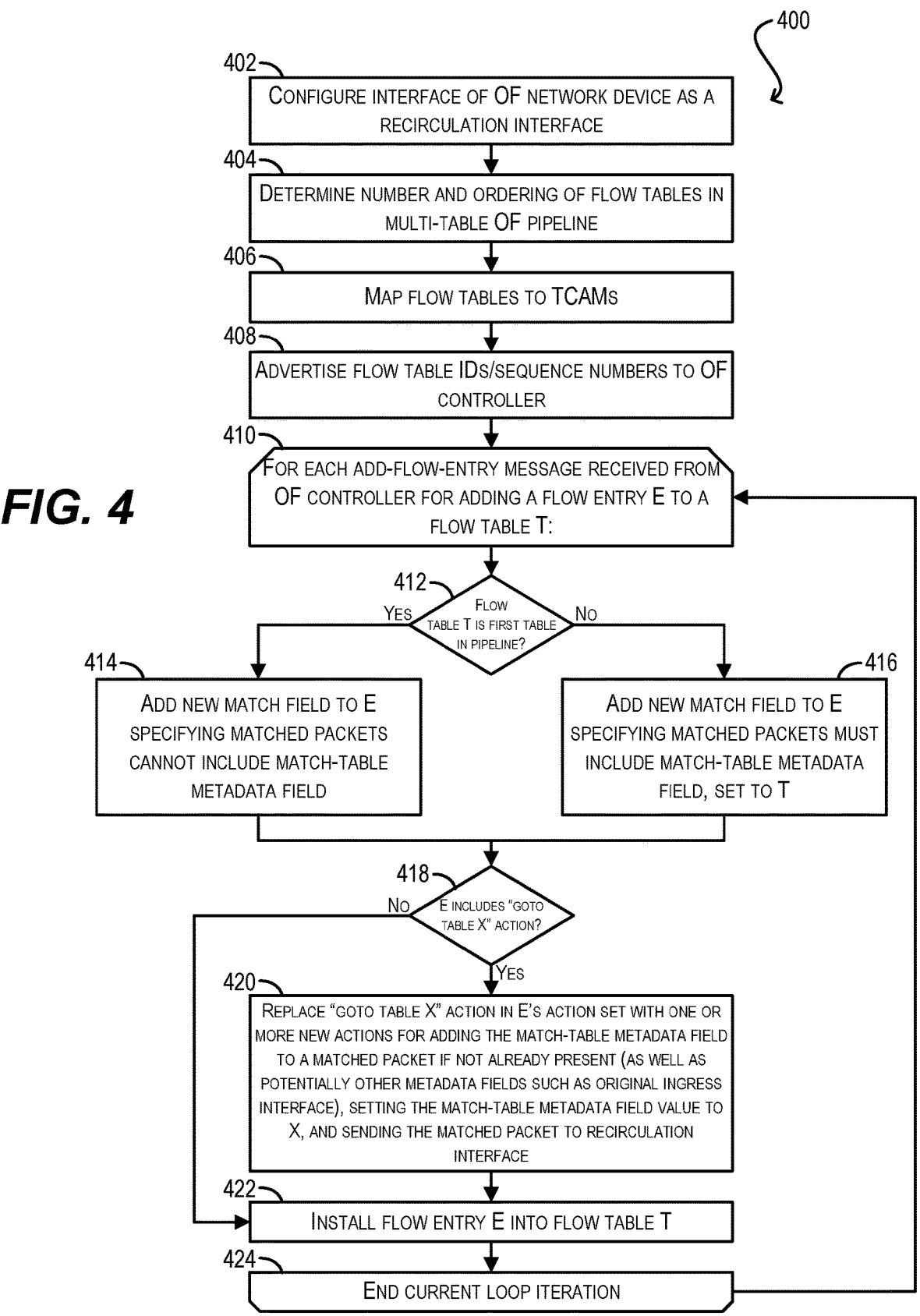
FIG. 4 depicts an OpenFlow agent workflow according to certain embodiments.

FIG. 4 depicts a workflow 400 that may be executed by OpenFlow agent 112 and its constituent flow entry conversion module 114 for implementing a multi-table OF pipeline according to certain embodiments. In the case where OF network device 100 is a "hybrid" OpenFlow network device (i.e., a network device that supports both OpenFlow operation and conventional Layer 2/3 switching and routing), workflow 400 may be initiated by agent 112 at the time multi-flow OpenFlow is enabled on the device. In the case where OF network device 100 solely supports OpenFlow operation, workflow 400 may be initiated by agent 112 at, e.g., boot-up of the device.

Starting with block 402, OpenFlow agent 112 can configure an interface 108 of OF network device 100 to operate as a recirculation interface. As mentioned previously, a recirculation interface is an interface/network port that operates in a "loop back" mode, such that all packets sent to the interface are looped back as ingress packets to the device's ingress processing pipeline (and thus, TCAM lookup logic) of packet processor 104.

At block 404, OpenFlow agent 112 can determine a desired number and ordering of flow tables in the multi-table OF pipeline to be implemented on the device. For example, if packet processor 104 includes N TCAMs, OpenFlow agent 112 may determine that N flow tables may be included in the pipeline and can assign a unique ID/sequence number to each flow table (e.g., flow table 0, flow table 1, flow table 2, and so on).

At block 406, OpenFlow agent 112 can map the flow tables determined at block 404 to the TCAMs of packet processor 104, which will cause any flow entries installed into a given flow table of the multi-table OF pipeline to be installed into the corresponding TCAM. In addition, at block 408, OpenFlow agent 112 can advertise the flow table IDs/sequence numbers to OF controller 102 via an appropriate OpenFlow protocol message.

Then, at block 410, OpenFlow agent 112 can initiate a recurring process for converting, using flow entry conversion module 114, flow entries specified in add-flow-entry messages received from OF controller 102. In particular, upon receiving an add-flow-entry message specifying the addition of a flow entry E to a flow table T in the multi-table OF pipeline, OpenFlow agent 112 can check whether flow table T is sequentially the first flow table in the pipeline (e.g., flow table 0) (block 412). If the answer is yes, OpenFlow agent 112 can add a new match field to the match field set of E specifying that, in addition to any match criteria specified in the other match fields of E, packets which match to E cannot include the match-table metadata field (block 414).

Alternatively, if the answer at block 412 is no, OpenFlow agent 112 can add a new match field to the match field set of E specifying that, in addition to any match criteria specified in the other match fields of E, packets which match to E must include the match-table metadata field with the field's value set to the ID/sequence number of flow table T (block 416).

Then, at block 418, OpenFlow agent 112 can further check whether flow entry E includes a "goto table X" action. If the answer is yes, OpenFlow agent 112 can replace the "goto table X" action in E's action set with one or more new actions that comprise: (1) adding the match-table metadata field to a matched packet (if not already present on the packet), (2) setting the value of the match-table metadata field to the ID/sequence number of flow table X, and (3) sending the matched packet, with the match-table metadata field value set to the ID/sequence number of X, to the recirculation interface configured at block 402 (block 420). In one set of embodiments, the action for adding and setting the match-table metadata field on the matched packet can involve invoking a proprietary packet encapsulation protocol supported by packet processor 104, such as Broadcom's HiGig/HiGig 2 protocol. In other embodiments, this action can involve re-purposing an existing packet header field of the matched packet as the match-table metadata field, and thus adding the match-table metadata field value to that existing packet header field.

In some embodiments, in addition to specifying the ID/sequence number of destination flow table X, the metadata added to the matched packet via the one or more new actions can also include other information, such as the original ingress interface of the packet.

Upon replacing the "goto table X" action at block 420 (or if it is determined that flow entry E does not include a "goto table" action), OpenFlow agent 112 can install flow entry E, as modified per the previous steps, into flow table T, and thus into flow table T's corresponding TCAM (block 422). Finally, at block 424, the current loop iteration can end and OpenFlow agent 112 can return to block 410 in order to process/convert any additional add-flow-entry messages received from OF controller 102.

It should be appreciated that workflow 400 is illustrative and various modifications are possible. For example, although workflow 400 indicates that, in the case where flow table T is the first flow table in the multi-table OF pipeline, OpenFlow agent 112 adds a new match field to E specifying that matched packets cannot include the match-table metadata field, in alternative embodiments agent 112 can also add a new match field specifying that matched packets must be received on an ingress interface 108 of OF network device 100, where such an ingress interface is not the recirculation interface. This additional match field ensures that only packets which are ingressing the device for the first time (i.e., those which have not been recirculated) can match to the flow entries of the first flow table in the pipeline.

Further, although workflow 400 operates under the assumption that only "new" flow entries—in other words, flow entries newly received from OF controller 102 via add-flow-entry messages—are converted in the manner specified, in certain embodiments this conversion process may also be applied to existing flow entries previously installed into the flow tables/TCAMs, either by OpenFlow agent 112 or via some other mechanism. In these embodiments, rather than performing blocks 412-422 at the time an add-flow-entry message is received from OF controller 102, OpenFlow agent 112 can execute these steps on each existing flow entry in the flow tables.

3. Example Packet Processing Scenario

To further clarify the operation of OpenFlow agent workflow 400, Table 2 below illustrates the results of applying this workflow to the flow entries previously shown in Table 1. As can be seen, match fields have been added and "goto table" actions have been replaced in accordance with the steps of workflow 400.

TABLE 2

| | Flow Table/ TCAM 0 | Flow Table/ TCAM 1 | Flow Table/ TCAM 2 |
|---|---|---|---|
| Flow entry 1 | match: VLAN 100 AND match: no match-table metadata field action: add/set match-table metadata field to 2 AND action: output packet to recirculation interface | match: all packets AND match: match-table metadata field = 1 action: drop | match: all packets AND match: match-table metadata field = 2 action: output packet on interface 5 |
| Flow entry | match: VLAN 101 AND | | |

TABLE 2-continued

| | Flow Table/<br>TCAM 0 | Flow Table/<br>TCAM 1 | Flow Table/<br>TCAM 2 |
|---|---|---|---|
| 2 | match: no match-table<br>metadata field<br>action: add/set match-<br>table metadata field<br>to 1<br>AND<br>action: output packet<br>to recirculation<br>interface | | |

Figure 5:
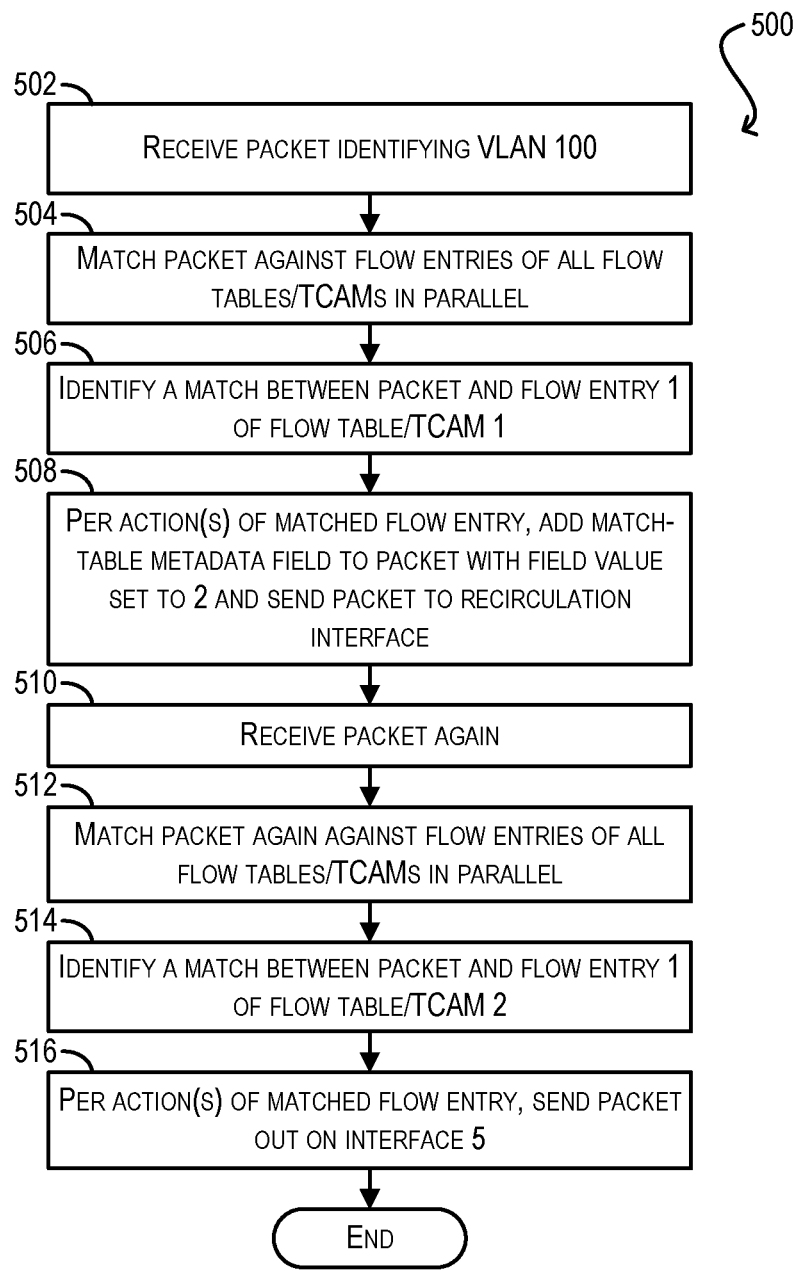
FIG. 5 depicts a packet processing workflow according to certain embodiments.

In addition, FIG. 5 depicts a packet processing workflow 500 carried out by packet processor 104 at the time of receiving a packet identifying "VLAN 100," per the converted flow entries shown above, using its parallel TCAM lookup architecture according to certain embodiments.

Starting with blocks 502 and 504, packet processor 104 receives the packet identifying VLAN 100 and matches the packet against the flow entries of all flow tables/TCAMs, 0, 1, and 2 in parallel. In response, packet processor 104 identifies a match between the packet and flow entry 1 of flow table/TCAM 1 (block 506).

Then, per the actions specified in flow entry 1 of flow table/TCAM 1, packet processor 104 adds the match-table metadata field to the packet, sets the field's value to 2, and sends the packet to the recirculation interface (block 508).

Upon sending the packet to the recirculation interface, packet processor 104 receives the packet again (block 510) and matches the packet again against the flow entries of all flow tables/TCAMs 0, 1, and 2 in parallel (block 512). However, in this pass, packet processor 104 identifies a match between the packet and flow entry 1 of flow table/TCAM 2 (block 514).

Finally, at block 516, packet processor 104 sends the packet out on interface 5 per the action specified in the matched flow entry.

The above description illustrates various embodiments of the present disclosure along with examples of how aspects of these embodiments may be implemented. The above examples and embodiments should not be deemed to be the only embodiments and are presented to illustrate the flexibility and advantages of the present disclosure as defined by the following claims. For example, although certain embodiments have been described with respect to particular flowcharts and steps, it should be apparent to those skilled in the art that the scope of the present disclosure is not strictly limited to the described workflows and steps. Steps described as sequential may be executed in parallel, order of steps may be varied, and steps may be modified, combined, added, or omitted. As another example, although certain embodiments have been described using a particular combination of hardware and software, it should be recognized that other combinations of hardware and software are possible, and that specific operations described as being implemented in hardware can also be implemented in software and vice versa.

The specification and drawings are, accordingly, to be regarded in an illustrative rather than restrictive sense. Other arrangements, embodiments, implementations and equivalents will be evident to those skilled in the art and may be employed without departing from the spirit and scope of the present disclosure as set forth in the following claims.

What is claimed is:

1. A method comprising:
    configuring, by a network device, an interface of the network device as a recirculation interface, the configuring causing a network packet sent by the network device to the recirculation interface to be looped back to the network device;
    receiving, by the network device, a flow entry to be installed into a flow table of the network device, the flow entry including a set of match fields and a set of actions, the set of match fields specifying one or more criteria for matching network packets to the flow entry, the set of actions specifying one or more actions to be taken on a matched network packet;
    determining, by the network device, that the set of actions include an action for matching the matched network packet against flow entries of another flow table of the network device; and
    in response to the determining, modifying the flow entry to be installed by replacing the action with one or more new actions for:
        adding a metadata field to the matched network packet;
        setting a value of the metadata field to an identifier of the another flow table; and
        sending the matched network packet, with the metadata field, to the recirculation interface; and
    installing the modified flow entry into the flow table.

2. The method of claim 1 wherein the flow table and the another flow table are part of a plurality of sequentially ordered flow tables.

3. The method of claim 2 further comprising:
    determining that the flow table is a first flow table in the plurality of sequentially ordered flow tables; and
    in response to determining that the flow table is the first flow table, adding a new match field to the set of match fields specifying that matched network packets should not include the metadata field.

4. The method of claim 2 further comprising:
    determining that the flow table is a first flow table in the plurality of sequentially ordered flow tables; and
    in response to determining that the flow table is the first flow table, adding a new match field to the set of match fields specifying that matched network packets should be received on one of a plurality of ingress interfaces of the network device, the plurality of ingress interfaces excluding the recirculation interface.

5. The method of claim 2 further comprising:
    determining that the flow table is a second or later flow table in the plurality of sequentially ordered flow tables; and
    in response to determining that the flow table is the second or later flow table, adding a new match field to the set of match fields specifying that matched network packets should include the metadata field, with the value of the metadata field set to the identifier of the flow table.

6. The method of claim 1 wherein the metadata field is added to the matched network packet by re-purposing an existing packet header field of the matched network packet to hold the metadata field and its value.

7. The method of claim 1 wherein the metadata field is added to the matched network packet via a proprietary packet encapsulation protocol supported by a packet processor of the network device.

8. The method of claim 1 wherein the flow table and the another flow table are implemented using hardware lookup tables residing in a packet processor of the network device, and wherein the packet processor employs a parallel lookup architecture for matching ingress network packets against the hardware lookup tables.

9. The method of claim 1, wherein the flow table and the another flow table are ternary content addressable memories in a packet processor of the network device.

10. A non-transitory computer readable storage medium have stored thereon program code executable by a network device, the program code comprising:
    code that causes the network device to receive a flow entry to be installed into a flow table of the network device, the flow entry including a set of match fields and a set of actions, the set of match fields specifying one or more criteria for matching network packets to the flow entry, the set of actions specifying one or more actions to be taken on matched network packets;
    code that causes the network device to, if the flow table is not a first flow table in a plurality of sequentially ordered flow tables, add a first new match field to the set of match fields specifying that the matched network packets should include a metadata field, with a value of the metadata field set to the identifier of the flow table; and
    code that causes the network device to, if the flow table is the first flow table, add a second new match field to the set of match fields specifying that the matched network packets should not include the metadata field; and
    code that causes the network device to, if the set of actions include an action for matching the matched network packets against flow entries of another flow table of the network device, replace the action with one or more new actions for:
        adding the metadata field to the matched network packets;
        setting the value of the metadata field to an identifier of the another flow table; and
        sending the matched network packets, with the metadata field, to a recirculation interface.

11. The non-transitory computer readable storage medium of claim 10 wherein the program code further comprises:
    code that causes the network device to, if the flow table is the first flow table, add a new match field to the set of match fields specifying that the matched network packets should be received on one of a plurality of ingress interfaces of the network device, the plurality of ingress interfaces excluding the recirculation interface.

12. The non-transitory computer readable storage medium of claim 10 wherein the program code further comprises:
    code that causes the network device to install the flow entry into the flow table.

13. The non-transitory computer readable storage medium of claim 10 wherein the plurality of flow tables are part of a multi-table OpenFlow (OF) pipeline of the network device.

14. The non-transitory computer readable storage medium of claim 10 wherein the plurality of flow tables are implemented using plurality of ternary content addressable memory (TCAM) banks residing in a packet processor of the network device.

15. The non-transitory computer readable storage medium of claim 14 wherein the packet processor employs a parallel lookup architecture for matching ingress network packets against the plurality of TCAM banks.

16. The non-transitory computer readable storage medium of claim 10 wherein the flow entry is included in an add-flow-entry message received by the network device from an OF (OpenFlow) controller.

17. A network device comprising:
    a packet processor;
    a plurality of interfaces including a recirculation interface; and
    a plurality of hardware lookup tables,
    wherein the packet processor:
        receives a network packet on an interface in the plurality of interfaces;
        matches the network packet against flow entries in the plurality of hardware lookup tables in parallel;
        identifies a match between the network packet and a first flow entry in a first hardware lookup table, wherein the first flow entry is produced by the network device by:
            receiving a flow entry to be installed into a flow table of the network device, the flow entry to be installed including a set of match fields and a set of actions, the set of match fields specifying one or more criteria for matching network packets to the first flow entry, the set of actions specifying one or more actions to be taken on a matched network packet;
            determining that the set of actions include an action for matching the matched network packet against flow entries of another flow table of the network device; and;
            in response to the determining, modifying the flow entry to be installed by-replacing the action with one or more new actions for:
                adding a metadata field to the matched network packet;
                setting a value of the metadata field to an identifier of the another flow table; and
                sending the matched network packet, with the metadata field, to the recirculation interface; and
        in response to identifying the match, executes the one or more actions in the modified first flow entry.

18. The network device of claim 17 wherein the first flow entry was previously received by the network device from a software-defined networking (SDN) controller.

19. The network device of claim 17 wherein flow entries in the first hardware lookup table include a match field specifying that matched network packets should not include the metadata field.

20. The network device of claim 17 wherein the packet processor further:
    receives the network packet again in response to being sent to the recirculation interface;
    matches the network packet again against the flow entries in the plurality of hardware lookup tables in parallel; and
    identifies a match between the network packet and a second flow entry in the second hardware table, wherein flow entries in the second hardware table include a match field specifying that matched network packets should include the metadata field, with the value of the metadata field set to the identifier of the second hardware lookup table.

* * * * *